(12) United States Patent
Nabrotzky

(10) Patent No.: US 11,769,399 B2
(45) Date of Patent: Sep. 26, 2023

(54) DYNAMIC CO-OPERATIVE ARRAYS OF ELECTROMAGNETIC MARKERS FOR HIGHLY AUTONOMOUS VEHICLE LOCATION AND CRYPTOGRAPHICALLY SECURE TRANSACTIONS

(71) Applicant: Edmund S. Nabrotzky, Pittsford, NY (US)

(72) Inventor: Edmund S. Nabrotzky, Pittsford, NY (US)

(*) Notice: Subject to any disclaimer, the term of this patent is extended or adjusted under 35 U.S.C. 154(b) by 496 days.

(21) Appl. No.: 16/732,221

(22) Filed: Dec. 31, 2019

(65) Prior Publication Data

US 2020/0211372 A1 Jul. 2, 2020

Related U.S. Application Data

(60) Provisional application No. 62/786,658, filed on Dec. 31, 2018.

(51) Int. Cl.
| | |
|---|---|
| *G08G 1/01* | (2006.01) |
| *G08G 1/042* | (2006.01) |
| *H04L 9/06* | (2006.01) |
| *H04W 4/44* | (2018.01) |
| *H04W 12/63* | (2021.01) |
| *G01S 13/75* | (2006.01) |

(52) U.S. Cl.
CPC ............ *G08G 1/0116* (2013.01); *G01S 13/75* (2013.01); *G08G 1/042* (2013.01); *H04L 9/0637* (2013.01); *H04W 4/44* (2018.02); *H04W 12/63* (2021.01)

(58) Field of Classification Search
CPC .............................. C08G 1/0116; G01S 13/75
See application file for complete search history.

(56) References Cited

U.S. PATENT DOCUMENTS

| | | | |
|---|---|---|---|
| 10,438,033 B1* | 10/2019 | Solomon | G06K 7/10415 |
| 2007/0188342 A1* | 8/2007 | Valeriano | G06K 17/00 340/8.1 |
| 2014/0191041 A1* | 7/2014 | Zhao | G06K 19/0723 235/492 |
| 2014/0219370 A1* | 8/2014 | Wang | H04L 25/03159 375/343 |
| 2018/0180708 A1* | 6/2018 | Vijaya Kumar | G01S 19/42 |
| 2020/0120458 A1* | 4/2020 | Aldana | H04W 4/08 |

* cited by examiner

*Primary Examiner* — Thomas S McCormack
(74) *Attorney, Agent, or Firm* — Phillips Lytle LLP

(57) ABSTRACT

A system that uses cooperative arrays of electromagnetic resonating markers in combination with a vehicle mounted resonating transceiver. Markers establish their position placement during a calibration sequence in which cryptographic keys are exchanged, ensuring the markers are placed by authorized personnel and that none can be removed/relocated without detection. Markers can then be reliably polled by passing vehicles to determine relative location in areas of sensor occlusion. The markers can also be securely used for emerging smart city financial transactions such as automated parking, garbage collection, deliveries, tolling or temporary pedestrian markets.

10 Claims, 6 Drawing Sheets

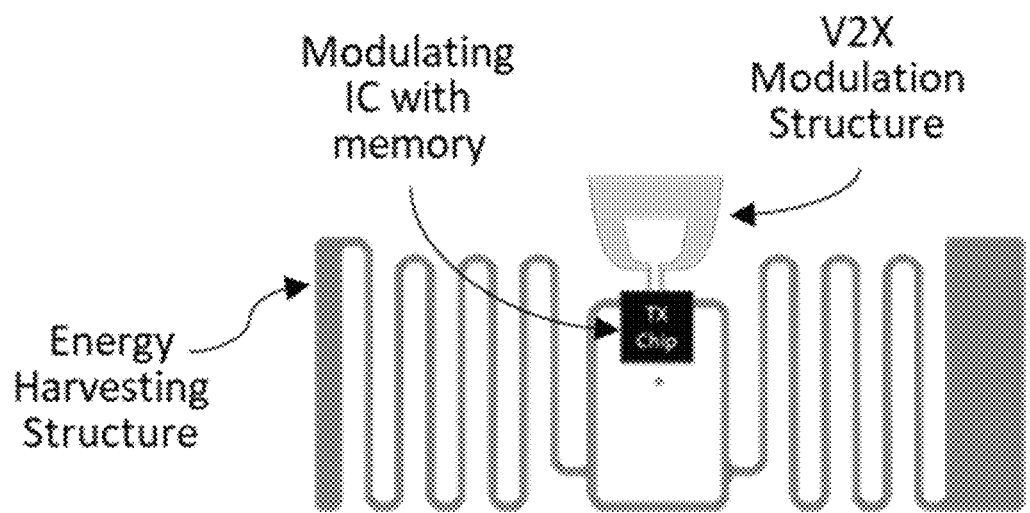
Fig 1: Passive v2X transponder with IC and dual resonating structures
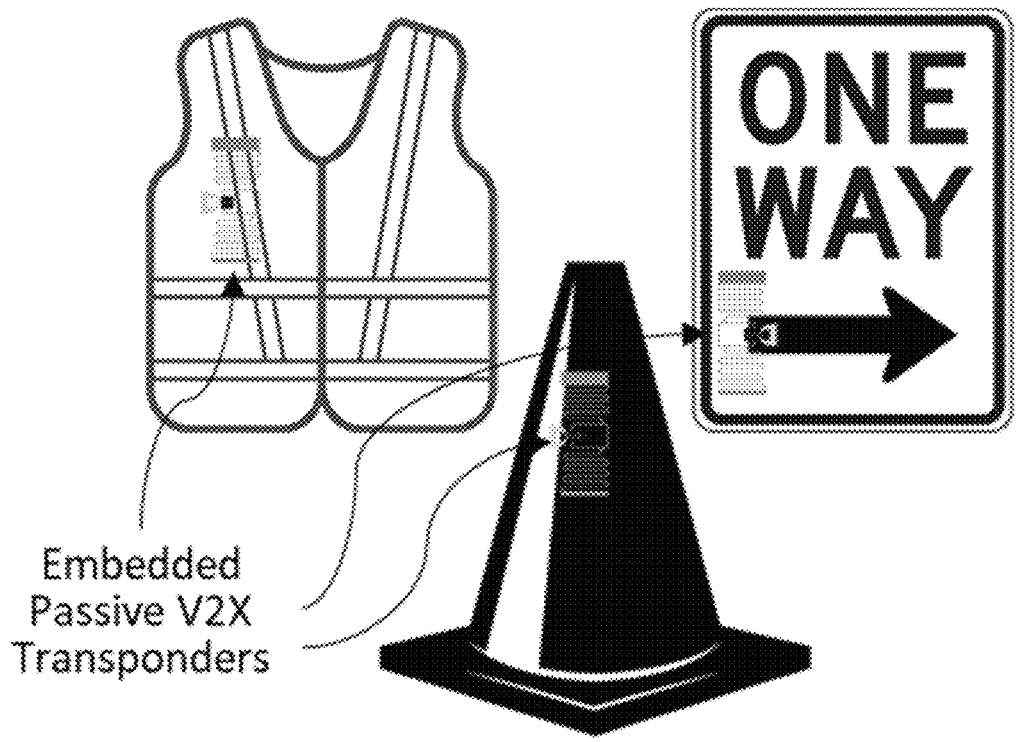
Fig 2: Typical Marker Embodiments

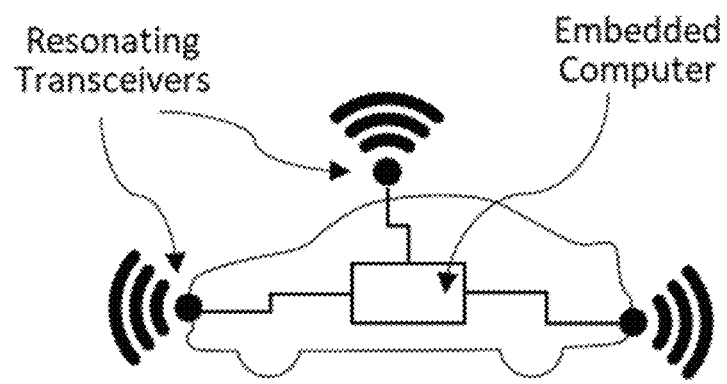
Fig 3: Vehicle Based Resonating Mobile Transceivers and Embedded Computer
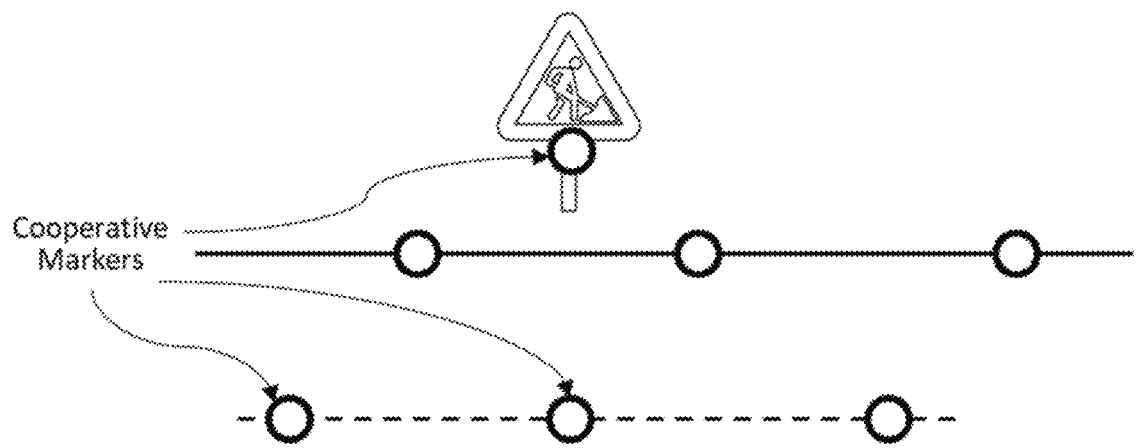
Fig 4: Cooperative Markers placed in a roadside Array

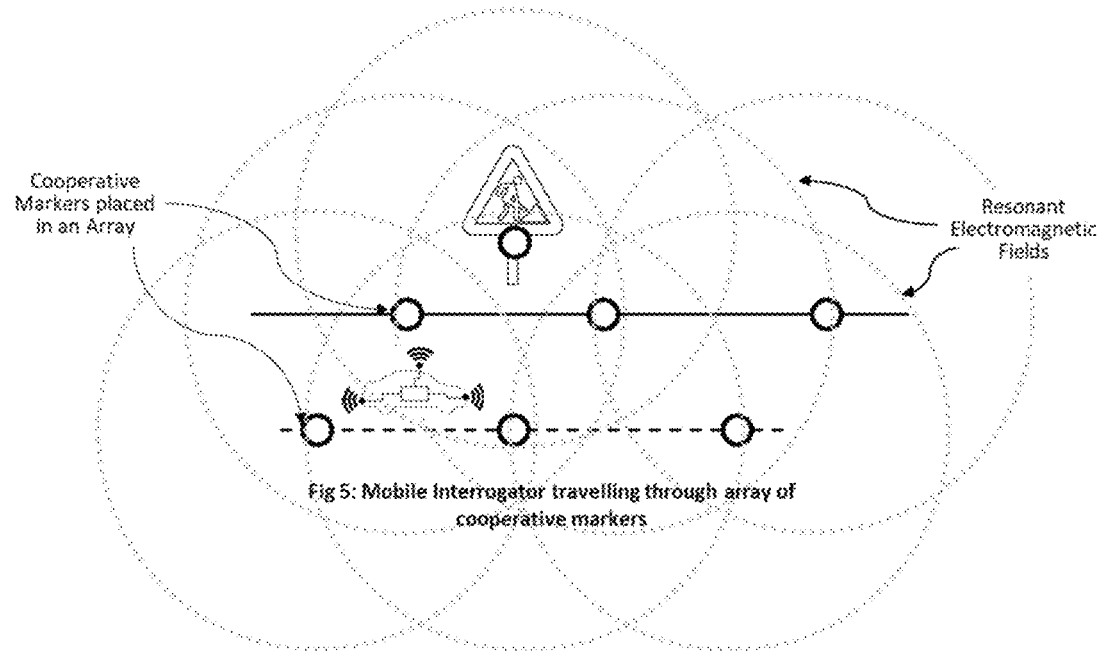
Fig 5: Mobile Interrogator travelling through array of cooperative markers
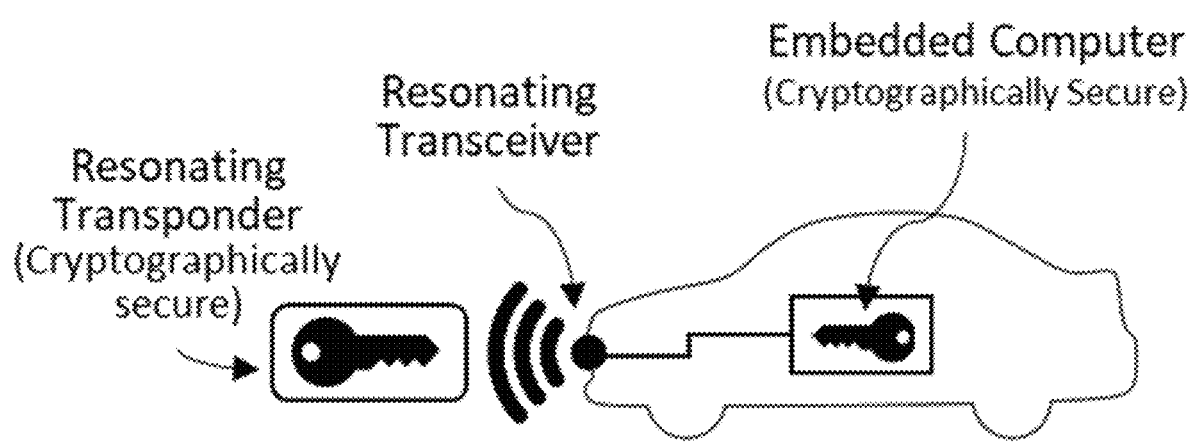
Fig 6: Secure transaction between Transponder and Transceiver

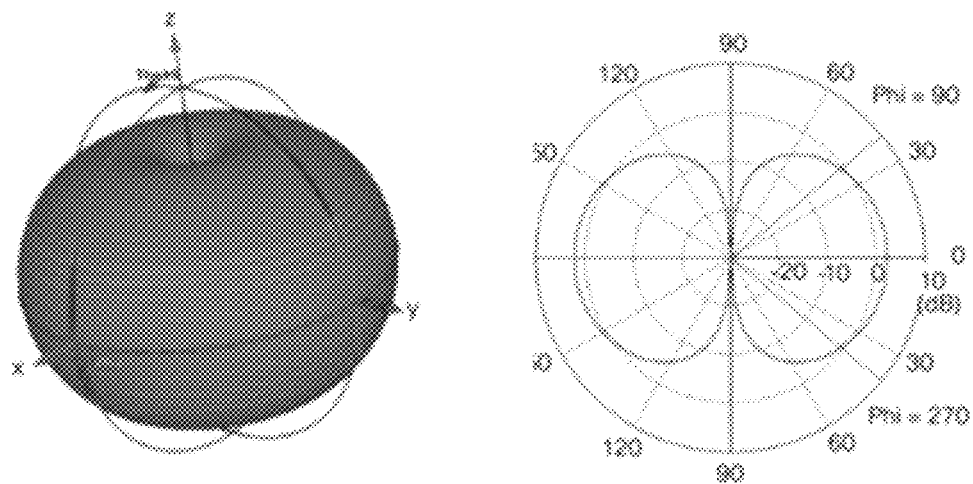
Fig 7: Dipole 3D radiation pattern and the Null field
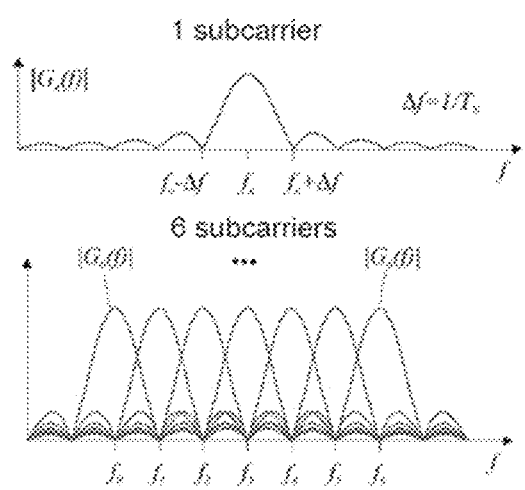
Fig 8: Cooperative Orthogonal Frequency Division Multiplexing

DYNAMIC CO-OPERATIVE ARRAYS OF ELECTROMAGNETIC MARKERS FOR HIGHLY AUTONOMOUS VEHICLE LOCATION AND CRYPTOGRAPHICALLY SECURE TRANSACTIONS

RELATED APPLICATIONS

This application claims priority from U.S. Provisional Patent Application No. 62/786,658 which was filed on Dec. 31, 2018, and is hereby incorporated by reference in its entirety.

STATEMENT REGARDING FEDERALLY SPONSORED RESEARCH OR DEVELOPMENT

Not Applicable

STATEMENT REGARDING PARTIES TO A JOINT RESEARCH AGREEMENT

Not Applicable

REFERENCE TO SEQUENCE LISTING, TABLE, OR COMPUTER PROGRAM LISTING

Not Applicable

STATEMENT REGARDING PRIOR DISCLOSURES BY THE INVENTOR OR A JOINT INVENTOR UNDER 37 C.F.R. 1.77(B)(6)

Not Applicable

TECHNICAL FIELD

This disclosure relates to a system of dynamic co-operative arrays of electromagnetic markers and methods of use thereof for highly autonomous vehicle location and cryptographically secure transactions.

BACKGROUND ART

Highly Autonomous Vehicles (HAV), otherwise referred to as self-driving cars, are in the process of introduction to the global market, with at least 30 companies testing initial prototypes and lawmakers discussing new legislation to govern their deployment and regulation.

In initial HAV guidelines, navigation has been largely defined as the domain of LiDAR, Radar, and Vision systems. Data communication is defined as 4G LTE or 5G cellular for internet/application access and IEEE 802.11p, IEEE 1609 or ETSI ITS-G5 for V2X (Vehicle to Vehicle or anything else) communication. While these sensors and communications technologies cover a wide range of cases, there remains an area of need to which this invention is targeted. Location detection via contemporary means can demonstrably be impaired in difficult weather conditions and tight urban environments. In addition, there remains a gap for local municipalities who desire the tools to signal temporary obstructions, special or changing zones (construction, school, parade etc.) or safeguard first responders. In initial testing, LiDAR, Radar and Vision systems have not performed satisfactorily and some need exists for additional positional verification in these cases. In addition, several Smart City financial applications being contemplated related to HAVs require cryptographically secure transactions to enable deployment.

The present disclosure is directed to overcoming these and other deficiencies in the art.

SUMMARY

The present disclosure relates to a system that uses cooperative arrays of electromagnetic resonating markers in combination with a vehicle mounted resonating transceiver. Markers establish their position placement during a calibration sequence in which cryptographic keys are exchanged, ensuring the markers are placed by authorized personnel and that none can be removed/relocated without detection. Markers can then be reliably polled by passing vehicles to determine relative location in areas of sensor occlusion. The markers can also be securely used for emerging Smart City financial transactions such as automated parking, garbage collection, deliveries, tolling, or temporary pedestrian markets, etc.

The present disclosure provides for the use of discrete transponders that may be employed cooperatively in a roadway or industrial infrastructure to locate moving HAVs in relation to such transponders, as well as to generate cryptographically secure transaction keys based on this generated location. The present invention enables unique cryptographic keys to be exchanged between infrastructure and vehicles for applications such as parking, garbage collection, deliveries, tolls, or a host of other interesting services that could be supported in the future.

The embodiments disclosed in this application to achieve the above-mentioned object has various aspects, and the representative aspects are outlined as follows. With parenthetical reference to the corresponding parts, portions or surfaces of the disclosed embodiment, merely for the purposes of illustration and not by way of limitation, the present disclosure provides a passive V2X transponder, decoupled electromagnetic energy harvesting, a memory with capability to be locked and unlocked, including cryptographically, and response modulation filters capable of operating at V2X frequencies, such modulation capable of being tuned to resonate centered on a specific frequency band.

At least one passive V2X transponder can be integrated into non-powered infrastructure devices selected from the group comprising road markers, signs, cones, barriers and personal safety equipment. The V2X transponder can also be integrated into at least one battery powered device where energy conservation is desired selected from the group comprising cell phones and battery powered lights. An impedance change caused by such integration is accommodated in the tuning of the resonating structure of the transponder, and the resonating structure of the transponder is isolated such that no impedance change occurs when integrated into such devices.

A plurality of V2X markers can be combined into a cooperative marker array configured to detect any change in location or arrangement of the markers by an interrogating transceiver. The system can be configured to detect any additional transponders added to the array, and any transponders removed from the array. The markers can participate in cooperative frequency division multiplexing, and the array can only be reconfigured by an authorized user (if desired).

At least one marker can be encoded with its measured location and relay the location as part of a beacon transmission or modulation.

An algorithm can be embedded in a mobile interrogator using measured and reported location information from the marker array, and the algorithm can be configured to provide for precise position locating and path of travel tracking in real time.

At least two mobile interrogators travelling through an array of markers with can cooperate to validate the marker array and refine positions.

A cloud-based public ledger of travel can be used with at least two contributors validating marker array attributes over time. Portions or keys of the public ledger for the marker array can be stored in at least two mobile transceivers in a manner such that the overall record is immutable.

Information from the marker array can be used as a cryptographic key to secure a location-based transaction or a publishable travel ledger.

At least one V2X marker may be encoded with a private key issued to an authorized user, and such marker can be configured to only be decoded by a public key issued by a regional authority.

A progression through the marker array and to a "null" field of a passive V2X resonating structure can also or alternatively be used as a cryptographic key to uniquely secure a location-based transaction.

A cooperative orthogonal multiplexing characteristic may be used as a signature for an array of markers or as a unique identifier for the marker array in a ledger or as a means to validate marker placement in the array.

According to the above noted aspects, cooperative arrays of electromagnetic resonating markers may be used in combination with a vehicle mounted resonating transceiver. Markers may establish their position placement during a calibration sequence in which cryptographic keys are exchanged, ensuring the markers are placed by authorized personnel and that none can be removed/relocated without detection. Markers can then be reliably polled by passing vehicles to determine relative location in areas of sensor occlusion. The markers can also be securely used for emerging smart city financial transactions such as automated parking, garbage collection, deliveries, tolling or temporary pedestrian markets.

BRIEF DESCRIPTION OF THE DRAWINGS

FIG. 1 shows an exemplary passive V2X transponder of the present disclosure with an integrated circuit and dual resonating structures.

FIG. 2 illustrates exemplary markers with embedded passive V2X transponders.

FIG. 3 shows a vehicle based resonating mobile transceiver and embedded computer.

FIG. 4 illustrates a plurality of cooperative markers in roadside array.

FIG. 5 illustrates an exemplary mobile interrogator travelling through an array of cooperative markers.

FIG. 6 illustrates a secure transaction between a transponder and receiver of the present disclosure.

FIG. 7 illustrates dipole 3D radiation pattern and the null field.

FIG. 8 is a graph illustrating cooperative orthogonal frequency division multiplexing

DESCRIPTION OF THE PREFERRED EMBODIMENTS

Figure 9:
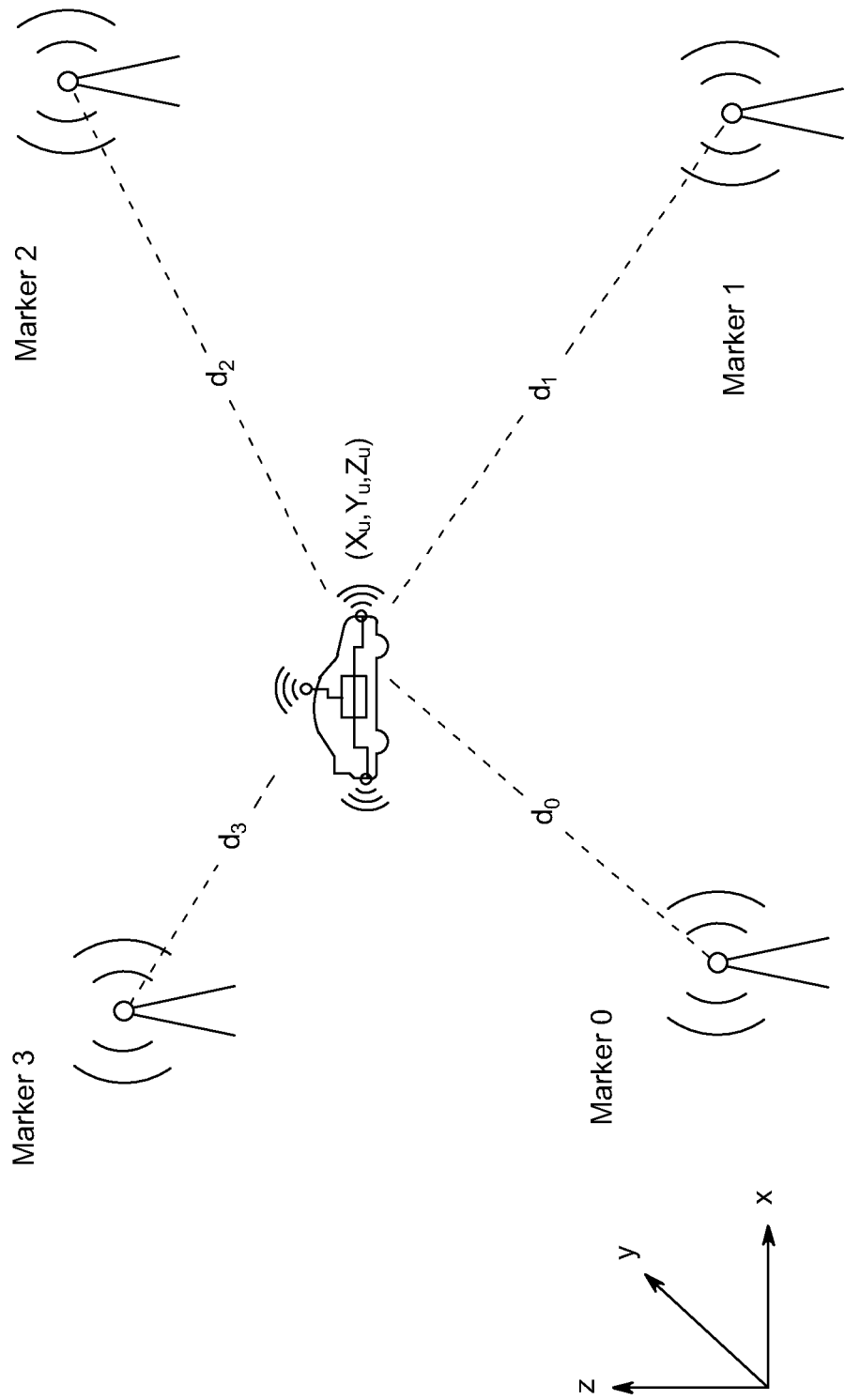
FIG. 9 is a graph illustrating enhancement of the ToF calculation using the reflection or modulation delay of the interrogation signal emanating from the vehicle reader.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention.

The present disclosure relates to a system that uses cooperative arrays of electromagnetic resonating markers in combination with a vehicle mounted resonating transceiver. The system includes one or more passive V2X transponders or powered beacons coupled to markers, a resonating transceiver, and a mobile embedded computing device coupled to the resonating transceiver, although the system may include other types and/or number of devices or components in other configurations. The system advantageously provides for the use of discrete, passive transponders that may be employed cooperatively in a roadway or industrial infrastructure to locate moving HAVs in relation to such transponders, as well as to generate cryptographically secure transaction keys based on this generated location. Similar system functions can also be achieved by powered beacons.

An exemplary passive V2X transponder is shown in FIG. 1. In this example, the passive V2X transponder includes an electromagnetic energy harvesting structure coupled to an integrated circuit (IC). The IC is capable of storing data and modulating a signal to match its data encoding. The IC is coupled to an electromagnetically resonant structure used for modulation of a carrier resonating across that structure. In another example, the system may be employed using beacons that are powered devices capable of initiating a V2X transmission without first being interrogated or powered by a transceiver station.

The system also includes one or more markers, such as shown in FIG. 2, by way of example. The markers are devices with an integrated or attached passive V2X transponders, or beacons in another example, encoded with a unique identification code and including information on its location and optionally other conditions or codes. As described in further detail below, in one example, an array of markers may be utilized.

In one example, the system includes a co-operative marker array that comprises a collection of markers that are placed in a proximity, as illustrated in FIG. 4. The marker array enables a mobile interrogator to encounter the backscatter modulation, or beacons, of a plurality of markers at any given time. In this example each marker stores and modulates or transmits information related to itself, such as location information, and immediately neighboring markers. Such storage of information and formation of the array may or may not be cryptographically secure. The markers may be lane and line markers on the road surface (reflective studs, speed bumps, "cat's eyes" etc.), regulatory signs (speed, crossings etc.), delivery location placards (loading docks, residential and commercial delivery points), toll zones (overhead or roadside signage), parking space signs (placards and cones), temporary zone markers (construction, wide vehicle, special event blockages etc.), although other objects may be used as the markers.

The system further includes a resonating transceiver that, in this example, is vehicle mounted as shown in FIG. 3. The resonating transceiver sends carrier waves and receives modulated signals from markers. HAVs will be mandated to operate V2X communication in the unlicensed ITS band of 5.9 GHz (5.85-5.925 GHz) in western countries and potentially 760 MHz (755.5 to 764.5 MHz) in the far east. The typical embodiments of the invention will leverage this infrastructure as a result but the invention is not limited to this specific frequency or the IEEE 802.11p, IEEE 1609 or ETSI ITS-G5 standards which are currently contemplated for adoption. Changes in the evolving standards, specifically frequency bands or protocols, should not have an impact on the basic invention, as migrating to these will be considered obvious to one skilled in the art.

The system further includes a mobile embedded computer with system software engine that may be connected to a plurality of resonating transceivers forming a mobile interrogator to execute real-time location calculation algorithms, perform the cryptographic encoding of markers, and store a related transaction ledger of marker interactions.

The mobile embedded computer in this example includes one or more processor(s), a memory, and/or a communication interface, which are coupled together by a bus or other communication link, although the mobile embedded computer can include other types and/or numbers of elements in other configurations.

The processor(s) of the mobile embedded computer may execute programmed instructions stored in the memory for the any number of the functions described and illustrated herein. In one example, the processor(s) executes a method for location of the vehicle in which it is embedded in a dynamic array of markers, as described in further detail below. The processor(s), in one example, execute algorithms that provide a location calculation algorithm in real-time. The processor(s) may further provide for the cryptographic assembly of a secure public ledger of path of travel.

The processor(s) may include one or more CPUs, GPUs, or general-purpose processors with one or more processing cores, for example, although other types of processor(s) can also be used. The processor(s) may also be artificial intelligence (AI) processor(s) that include deep learning technology, such as neural networks, for example.

The memory stores these programmed instructions for one or more aspects of the present technology as described and illustrated herein, although some or all of the programmed instructions could be stored elsewhere. A variety of different types of memory storage devices, such as random-access memory (RAM), read-only memory (ROM), hard disk, solid state drives, flash memory, or other computer readable medium which is read from and written to by a magnetic, optical, or other reading and writing system that is coupled to the processor(s), can be used for the memory.

Accordingly, the memory of the mobile embedded computer can store one or more applications or programs that can include computer executable instructions that, when executed by the mobile embedded computer, cause the mobile embedded computer to perform actions described and illustrated below. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) (VM[s]) or virtual server(s) that may be managed in a cloud-based computing environment. Also, the application(s) may be running in one or more VMs executing on the image acquisition computing device. The communication interface operatively couples and communicates between the mobile embedded computer and the resonating transceiver.

In another example, the mobile embedded computer is a highly integrated microcontroller device with a variety of onboard hardware functions, such as ADCs, digital-to-analog converters (DACs), serial buses, general purpose I/O pins, RAM, and ROM.

Although the exemplary mobile embedded computer is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the mobile embedded computer. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, packet data networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Energy Harvesting for Passive V2X Markers.

A highly desirable advancement in V2X is the invention of a passive (RF energy harvesting) marker embodiment. Much prior art exists in the field of energy harvesting circuits generally (see, e.g., U.S. Pat. No. 8,621,245B2: Shearer et al). However, the distances, high frequencies and unknown configuration of V2X has inhibited invention in this important area. The following disclosure is instructive to those seeking to implement passive V2X markers to overcome the known issues.

A V2X marker typically includes a resonating structure or antenna, a power management circuit and a simple logic circuit with some memory storage (such as a unique beacon value). In initial embodiments, the power management circuit includes a power storage device, such as a battery. It is expected that advances in V2X semiconductor technology will miniaturize the electronics enough that a marker can be powered solely by the RF signal it receives. Such semiconductors will have at least one rectifier circuit and a charge pump circuit to harvest power from the RF signal received via the antenna. The alternating RF wave received by the resonating structure is converted by the rectifier circuit and charge pump circuit into DC (Direct Current) voltage to power the RF beacon of the marker and enable limited writing and locking of the memory storage in the semiconductor.

Power density (S) can be calculated by the known formula:

$$A_e = \frac{G_R(\theta_R, \phi_R)\lambda^2}{4\pi}(1-|\Gamma_R|^2)|\hat{p}_T \cdot \hat{p}_R|^2$$

However, the Effective Area (Ae) of an antenna decreases by frequency squared:

$$S = \frac{P_T G_T(\theta_T, \phi_T)}{4\pi r^2}(1-|\Gamma_T|^2)$$

Since V2X frequencies are typically very high, at more than 5 GHz, effective areas are significantly reduced. Fortunately, markers (such as roadway signs, placards and cones) have significant surface area to work with to increase the overall size of the antennae to combat this "Friis effect". As shown in the example below, the size of the harvesting structure must grow exponentially (increasing the frequency 2× requires antennae size to grow 4×).

$$P_R = P_T \frac{G_T(\phi_T, \theta_T)G_R(\theta_R, \phi_R)\lambda^2}{(4\pi r)^2}(1-|\Gamma_T|^2)(1-|\Gamma_R|^2)|\hat{p}_T \cdot \hat{p}_R|^2$$

$$P_R = P_T \frac{G_T G_R \lambda^2}{(4\pi r)^2}$$

$$2 \times f \to 1/2 \; \lambda \to 1/4 \; P_R \; \therefore G_R \uparrow 4 \to = P_R$$

Prior art in passive UHF RFID and subsequent embodiments in the market detail demonstrated ability of structures resonating at 930 MHz to harvest sufficient energy to be identified at useable distances (up to 50 m). However, according to the formulas given, extending that technology to 5 GHz frequencies will require resonating structures with effective areas at least 64 times the size of the largest conventional RFID tags deployed today. While structure sizes of this order may be practical for large roadway devices, it should be noted that as antenna structures increase in size they are also increasingly anisotropic (directional) in their effectiveness. This combination of required size and focused directionality has prevented development of new art in the target higher frequency range demanded in for V2X adoption.

Fortunately, antenna design for V2X markers can be both large and oriented to a known path of travel. Signs, placards and lane markers can all assume the direction of travel (usually orthogonal to the leading surface) of the interrogator and will be designed to optimize energy harvesting in relation to it. Creating a phased rectifier and charge pump semiconductor circuit for this frequency should then follow similar techniques as developed in prior art (see, e.g., U.S. Pat. No. 7,561,866B2: Oliver & Diorio, Impinj et al).

An additional aspect of large, directional antennas for energy harvesting at V2X frequencies is that a very well defined "null" field will be created perpendicular to the marker. As a vehicle approaches such a marker, it will receive the radiated signal best as it approaches the surface orthogonal to the path of travel but will completely lose the signal when it is very close and perpendicular to this surface. The signal reception will resume as soon as the vehicle travels through the null area and encounters the signal emanating from the orthogonal surfaces of the structure again. Where the path of travel is relatively distant from the marker, this null field will not be definitively encountered due to far field propagation characteristics in RF transmission.

As a result, this close-proximity null field can be very useful to verify specific presence in relation to a marker. For example, a vehicle might want to verify the exact point at which a speed limit changes based on a posted placard in a construction zone or exactly which parking place it is positioned in at a municipal garage or which loading dock door it has pulled up to for a delivery at a warehouse. In each of these use cases and many others, capturing a verified exact marker position in relation to the null will be both possible and very useful.

Cryptography Supporting the Placement of Markers.

A cryptographic function of the form $y^2=x^3+ax+b$, where $4a^3+27b^2\neq 0$ is used to generate a curve.

This curve is then transformed to $y^2 \bmod p=(x^3+ax+b) \bmod p$, where p is the largest prime number that is smaller than $2^n$, where n is the size of the trailing bits specified in a connected vehicle BSM— Basic Safety Message (currently specified in the industry as 254).

A random prime number between 0-n is chosen (or issued) to an authority to generate a private key.

Each marker will be placed with a hashed value of n bits generated by this function. The hashed value is generated by a binary expansion value from the curve, such that as each marker is placed in the array, the sequenced ordinal value of the marker is used to reflect the previous point (reflected along a line of fit on the curve or across the x-axis) to find a next valid point on the cryptographic curve.

In other words, we compute x·P, where x is a random n-bit prime number. The result will be some point on the curve. Let's call that point X. If the marker beacon can be decoded easily to give X, could a malicious actor determine x? In other words, could someone determine how many times P was added to itself to get the point X on the curve? Even if we assume that all know what P is (we can count the number of markers in the array) and you know what curve is being used (it is published in a standard)?

There is no known algorithm for determining x, so the only option is to keep adding P to itself until finding X or subtracting P from X until you get P. The number of operations to calculate this, even at a modest key size of 254 bits, will require an infeasible amount of computing effort to break ($2^{127}$ computations or 1.7014118e+38 steps on average).

When a vehicle is operating in the area of an authority (aka a municipality or state DOT) the curve to be used in validating authoritative markers is made public (or downloaded to the vehicle) along with a public key used to decode marker beacon values as they are received through the BSM transmissions. The authority will have used its secret private key to encode the markers at placement (through devices issued to authorized construction contractors, first responders or municipal maintenance staff for example). The computing power to verify that a marker value is on the curve (substituting the equation values and running the calculation) is trivial for the vehicle computer and can be done in real time at very high speed. If the marker values fail to meet the published curve after this quick calculation, it can be reliably detected as placed by a malicious actor and the vehicle can take appropriate action.

Note that from this marker embodiment of elliptic curve cryptography springs another useful invention applicable to the use case. Since each marker is encoded with the next point along the cryptographic curve according to a private key step function, we can detect if a step is missing or has been added as the array is encountered. The function thus serves to not only validate marker values along the curve but to ensure that markers, once placed, cannot be re-arranged in sequence by malicious actors without detection. This means that an authoritatively placed marker (say a traffic cone) cannot be removed from an array and placed in another location without being detected, even if its BSM value being transmitted still solves to the authoritative cryptographic curve. This technique is a significant invention for dynamically placed marker arrays that substantially improves the security of the art.

An additional refinement or embodiment of the invention is to add an LOF (local outlier factor) value to the BSM value transmitted by each marker. This value is a mathematical density calculation well known in the art (practitioners of RF networking or cellular providers) which in this embodiment can provide a statistically reliable indication of whether the marker has been significantly moved in relation to its nearest neighbors or at least a line of travel drawn through them. While it is not material to the disclosure to recount the various established techniques used in calculating an LOF value from the line of travel, it is important to highlight the use of a calculated LOF to be appended or incorporated into the BSM transmission (trivial implementation but adding size and complexity to the operation) or as an offset modifier to be used in OFDM (Orthogonal Frequency Division Multiplexing).

Note the very desirable dual advantages in embodiments that specifically apply the LOF factor to OFDM: transmission length from the markers can be greatly reduced and marker displacement can be detected en masse through a single frequency spectrum analysis or RF map of the array.

Locating the Reader in Relation to the Array.

Real-time locating systems (RTLS) are used pervasively in many industries to wirelessly identify and track the location of objects or people in real time, usually within a building, yard or other contained area. Wireless RTLS tags/transponders are attached to objects or worn by people that move through the zone, and in most RTLS, fixed reference points receive wireless signals from tags to determine their location. Examples of real-time locating systems include tracking materials moving through a warehouse, finding medical equipment in a hospital or tracking the buying process of goods in a retail enterprise. Typically, these systems rely on calculations of time of flight, time delay of arrival, angle of arrival or a combination of these three to locate an object in the defined zone based on an RF signal. All of these techniques are well established in the art with many embodiments.

A novel component in the present disclosure is the use of an array of fixed simple location markers to act as reference points for establishing the location of a moving interrogator doing ToF (time of flight) calculations while travelling through the array. Each marker is encoded with an absolute position (survey grade GPS) or an offset value from nearest neighbors in the array (measured) so that the receiver in the vehicle can compare a calculated ToF to the expected ToF for improved accuracy in all three dimensions without the use of multiple readers or time synchronization beacons.

For an active (powered or simplex transmission) marker, the calculation is made based on the time of flight and the reported position of the marker. As ToF measurements will be taken approximately every 100 ms (or 10× per second) and from a multiplicity of antennae mounted on the vehicle, a series of measurements can be averaged to obtain a very good locational position of the marker.

As shown in FIG. 9, for a passive (energy harvesting transponder that modulates backscatter signals) marker, the ToF calculation can be enhanced using the reflection or modulation delay of the interrogation signal emanating from the vehicle reader. This can be extremely accurate once the contemplated semiconductor implementation is mature and repeatable.

With cloud-based data aggregation, connected vehicles can also share their calculated information with the next vehicle, building on each other to drive even higher levels of accuracy as each vehicle encounters the marker array.

Figure 10:
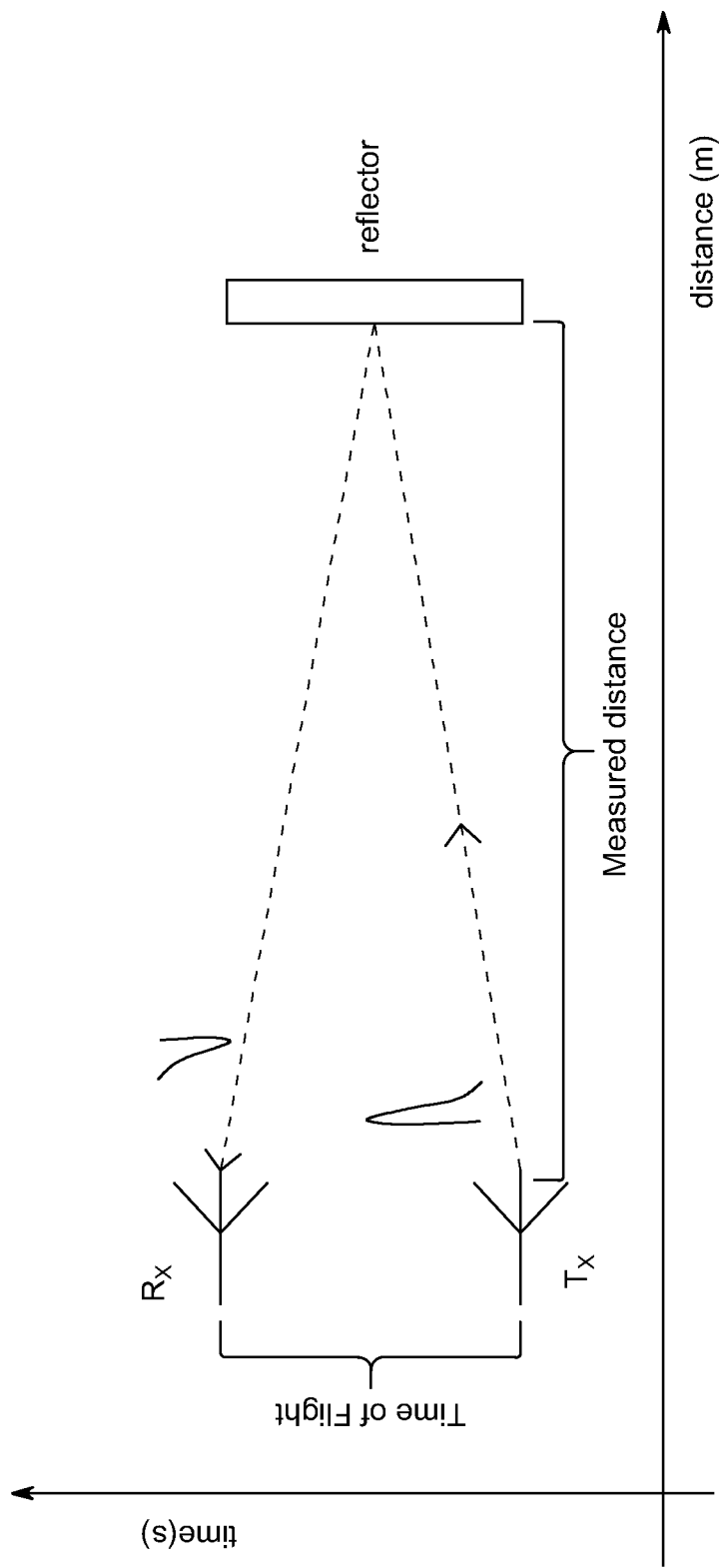
FIG. 10 is a schematic diagram showing a multiplicity of measurements from an array of markers.

Turning to FIG. 10, the use of a multiplicity of measurements from an array of markers in this manner to gain accuracy rather than synchronized fixed reader infrastructure or close tolerance phased receiver antennae is unique to the art and especially useful for rugged and frequently dynamic roadside applications.

Note that the physical layer of RTLS technology is usually some variant of radio frequency (RF) communication, but some systems use optical (usually infrared) or acoustic (usually ultrasound) technology instead of or in addition to RF.

An exemplary operation of the system of the present invention for location of a HAV using a dynamic array of markers will now be described.

First, markers are placed in an array on or around a roadway such that a vehicle will pass alongside, over or through them. An exemplary array with a vehicle passing through is illustrated in FIG. 5. The mobile interrogator, which includes the plurality of resonating transceivers, commissions the markers in a manner that each marker in the array may be cryptographically unlocked and encoded with a private key identifying an authorized marker placement as illustrated in FIG. 6.

In this example, the measured location triplet data of the marker and the marker ID are combined to create a unique marker code. In the case of a cooperative marker array, each marker may be encoded with precedent and antecedent marker information in a manner that links them in an immutable chain.

In this example, each marker in the cooperative marker array is designated to participate on a carrier in a COFDM (Cooperative Orthogonal Frequency Division Multiplexing) array. FIG. 8 illustrates a graph demonstrating the COFDM.

Once commissioned, a mobile interrogator associated with a vehicle can pass through, over or around the array of markers and encounter multiple backscatter signals as it interrogates the array. The mobile interrogator can determine its relative position in the array based on a plurality of TDoA (Time Difference of Arrival) and AoA (Angle of Arrival) measurement of backscatter signals. This typical calculation is made more precise with the refining factor of each signal also being encoded with the placed position of its marker, enabling an accurate resolving algorithm between measured and expected outcomes relative to each marker. In addition, refinements of correlation with sensor data via Kalman filtering in the mobile interrogator may be employed.

In one example, a public ledger of travel through the array by previous mobile interrogators is kept on the mobile embedded computer, such that a new agent travelling through may consult it and add another "vote" on the positioning and state of the array, enhancing accuracy and validity.

In one example, the mobile interrogator can determine whether a marker has been moved, is missing or was placed by an unauthorized agent in the array. Each cooperative marker in the array may be encoded with a cryptographic function that is influenced by the placed position of the previous marker and next marker in the array, such that any gaps or reorganization of the markers without recalculating the identification is obvious. This may also be embodied by the marker responding on a particular sub-carrier frequency that sequentially cooperates with adjacent markers in the array in a cooperative orthogonal frequency division multiplexing manner. Each co-operative marker may be cryptographically encoded with a private key of the placement agent that can be validated by use of a public key issued by the transportation authority of the region where the marker has been placed.

In one example, a travel ledger can be kept that shows the path of travel in reference to markers. The mobile interrogator can calculate its exact position, speed and dwell times through, over or around the array and keep them in a local travel ledger. The mobile interrogator can relay its information to other systems, including other mobile interrogators and supervisory systems, creating a public ledger of travel. These ledger entries can be validated by preceding and following mobile interrogators encountering the array such that they become an immutable public record of travel through the array.

A mobile interrogator may also seek to encounter any individual marker. The marker may be placed in specific orientation to enable exact electromagnetic locating of a mobile interrogator relative to it. A mobile interrogator may progress through the electromagnetic field of the marker and use the center of the null field, as shown in FIG. 7, as a precise point of demarcation. The mobile interrogator can exchange cryptographic information with the marker based on the previously encountered marker(s) in the cooperative array to enable the exchange of a transaction token when entering or leaving the null.

Accordingly, the system advantageously provides for the use of discrete, passive transponders that may be employed cooperatively in a roadway or industrial infrastructure to locate moving HAVs in relation to such transponders, as well as to generate cryptographically secure transaction keys based on this generated location.

The present disclosure contemplates that many changes and modifications may be made. Therefore, while the presently-preferred form of the system has been shown and described, and several modifications and alternatives discussed, persons skilled in this art will readily appreciate that various additional changes and modifications may be made without departing from the spirit of the disclosure, as defined and differentiated by the following claims.

What is claimed is:

1. A passive V2X transponder comprising:
   decoupled electromagnetic energy harvesting,
   a memory with capability to be locked and unlocked, including cryptographically, response modulation filters capable of operating at V2X frequencies,
   such modulation capable of being tuned to resonate centered on a specific frequency band,
   the integration of at least one passive V2X transponder into non-powered infrastructure devices selected from the group comprising road markers, signs, cones, barriers and personal safety equipment,
   the integration of at least one passive V2X transponder into at least one battery powered device where energy conservation is desired selected from the group comprising cell phones and battery powered lights,
   wherein an impedance change caused by such integration is accommodated in the tuning of the resonating structure of the transponder, and
   wherein the resonating structure of the transponder is isolated such that no impedance change occurs when integrated into such devices.

2. A method of arranging V2X markers into a cooperative marker array, comprising:
   detecting any change in location or arrangement of the markers by an interrogating transceiver,
   detecting any additional transponders added to the array,
   detecting any transponders removed from the array,
   wherein said markers can participate in cooperative frequency division multiplexing, and
   wherein the array can only be reconfigured by an authorized user,
   encoding at least one said marker with its measured location and relaying said location as part of a beacon transmission or modulation.

3. A method of arranging V2X markers into a cooperative marker array, comprising:
   detecting any change in location or arrangement of the markers by an interrogating transceiver,
   detecting any additional transponders added to the array,
   detecting any transponders removed from the array,
   wherein said markers can participate in cooperative frequency division multiplexing, and
   wherein the array can only be reconfigured by an authorized user,
   embedding an algorithm in a mobile interrogator using measured and reported location information from the marker array, wherein said algorithm is configured to provide for precise position locating and path of travel tracking in real time.

4. A method of arranging V2X markers into a cooperative marker array, comprising:
   detecting any change in location or arrangement of the markers by an interrogating transceiver,
   detecting any additional transponders added to the array,
   detecting any transponders removed from the array,
   wherein said markers can participate in cooperative frequency division multiplexing, and
   wherein the array can only be reconfigured by an authorized user,
   at least two mobile interrogators travelling through said array of markers with said
   at least two mobile interrogators cooperating to validate said array and to refine positions.

5. A method of arranging V2X markers into a cooperative marker array, comprising:
   detecting any change in location or arrangement of the markers by an interrogating transceiver,
   detecting any additional transponders added to the array,
   detecting any transponders removed from the array,
   wherein said markers can participate in cooperative frequency division multiplexing, and
   wherein the array can only be reconfigured by an authorized user,
   a cloud-based public ledger of travel and at least two contributors validating said marker array attributes over time.

6. The method of claim 5, wherein portions or keys of the public ledger for the marker array are stored in at least two mobile transceivers in a manner that the overall record is immutable.

7. The method of claim 5, wherein information from the marker array is used as a cryptographic key to secure a location-based transaction or a publishable travel ledger.

8. The method of claim 5, wherein at least one V2X marker is encoded with a private key, and wherein said V2X marker is decoded by a public key issued by a regional authority.

9. A method of arranging V2X markers into a cooperative marker array, comprising:
- detecting any change in location or arrangement of the markers by an interrogating transceiver,
- detecting any additional transponders added to the array,
- detecting any transponders removed from the array,
- wherein said markers can participate in cooperative frequency division multiplexing, and
- wherein the array can only be reconfigured by an authorized user,
- wherein a progression through the marker array and to a "null" field of a passive V2X resonating structure is used as a cryptographic key to uniquely secure a location-based transaction.

10. A method of arranging V2X markers into a cooperative marker array, comprising:
- detecting any change in location or arrangement of the markers by an interrogating transceiver,
- detecting any additional transponders added to the array,
- detecting any transponders removed from the array,
- wherein said markers can participate in cooperative frequency division multiplexing, and
- wherein the array can only be reconfigured by an authorized user,
- wherein a cooperative orthogonal multiplexing characteristic is used as a signature for an array of markers or as a unique identifier for said array in a ledger or as a means to validate marker placement in said array.

* * * * *